US010030585B2

(12) United States Patent
Flouros et al.

(10) Patent No.: US 10,030,585 B2
(45) Date of Patent: Jul. 24, 2018

(54) SHAFT SEAL SYSTEM AND A COMPRESSOR HAVING A CORRESPONDING SHAFT SEAL SYSTEM

(71) Applicant: MTU Aero Engines AG, Munich (DE)

(72) Inventors: Michael Flouros, Munich (DE); Richard Scharl, Karlsfeld (DE); Francois Cottier, Unterschleissheim (DE)

(73) Assignee: MTU Aero Engines AG, Munich (DE)

( * ) Notice: Subject to any disclaimer, the term of this patent is extended or adjusted under 35 U.S.C. 154(b) by 177 days.

(21) Appl. No.: 14/843,607

(22) Filed: Sep. 2, 2015

(65) Prior Publication Data

US 2016/0061116 A1 Mar. 3, 2016

(30) Foreign Application Priority Data

Sep. 3, 2014 (DE) .................. 10 2014 217 647

(51) Int. Cl.
| | |
|---|---|
| *F16J 15/40* | (2006.01) |
| *F16J 15/16* | (2006.01) |
| *F02C 7/28* | (2006.01) |
| *F01D 11/04* | (2006.01) |
| *F01D 11/02* | (2006.01) |
| *F04D 19/02* | (2006.01) |
| *F04D 29/10* | (2006.01) |

(52) U.S. Cl.
CPC ............... *F02C 7/28* (2013.01); *F01D 11/02* (2013.01); *F01D 11/04* (2013.01); *F04D 19/02* (2013.01); *F04D 29/102* (2013.01); *F16J 15/164* (2013.01); *F16J 15/406* (2013.01)

(58) Field of Classification Search
CPC ........ F16J 15/002; F16J 15/004; F16J 15/164; F16J 15/40; F16J 15/406; F16J 15/4472; F01D 11/02; F01D 11/04; F02C 7/28
See application file for complete search history.

(56) References Cited

U.S. PATENT DOCUMENTS

| | | | |
|---|---|---|---|
| 3,071,384 A | | 1/1963 | Friberg |
| 4,010,960 A | * | 3/1977 | Martin ................... F16J 15/406 |
| | | | 277/430 |

(Continued)

FOREIGN PATENT DOCUMENTS

| | | |
|---|---|---|
| DE | 1 106 567 | 5/1961 |
| DE | 36 12 877 A1 | 10/1987 |

(Continued)

OTHER PUBLICATIONS

European Search Report issued in European counterpart application No. 15180667.6-1751 dated Feb. 18, 2016, with Statement of Relevancy (Eight (8) pages).

(Continued)

*Primary Examiner* — Nicholas L Foster
(74) *Attorney, Agent, or Firm* — Crowell & Moring LLP

(57) ABSTRACT

A shaft seal system which is disposed axially between a first chamber and a second chamber is disclosed. The shaft seal system includes a shaft, a casing that surrounds the shaft, and a seal which is disposed axially closer to the second chamber where the first chamber has a fluid and the second chamber is to be protected from the fluid. In this arrangement, the seal includes a pressure booster.

8 Claims, 1 Drawing Sheet

(56) References Cited

U.S. PATENT DOCUMENTS

| | | | | |
|---|---|---|---|---|
| 4,084,825 A | * | 4/1978 | Ludwig | F01D 11/02 |
| | | | | 277/348 |
| 4,114,059 A | | 9/1978 | Albaric et al. | |
| 4,243,230 A | * | 1/1981 | Baker | F16J 15/406 |
| | | | | 277/387 |
| 4,350,345 A | | 9/1982 | Kalan et al. | |
| 5,165,699 A | * | 11/1992 | Shrontz | F16J 15/406 |
| | | | | 277/301 |
| 5,451,066 A | * | 9/1995 | Totain | F16J 15/406 |
| | | | | 277/347 |
| 8,647,052 B2 | | 2/2014 | Alfes et al. | |
| 8,932,001 B2 | | 1/2015 | Zheng et al. | |
| 2004/0056423 A1 | * | 3/2004 | Staljanssens | F04C 27/009 |
| | | | | 277/305 |
| 2010/0276893 A1 | * | 11/2010 | Jewess | F16J 15/164 |
| | | | | 277/424 |
| 2013/0075975 A1 | * | 3/2013 | Hilaris | F04C 15/0003 |
| | | | | 277/350 |

FOREIGN PATENT DOCUMENTS

| | | |
|---|---|---|
| DE | 10 2008 048 942 A1 | 4/2010 |
| DE | 10 2012 108 122 A1 | 3/2013 |
| EP | 0 491 624 A1 | 6/1992 |

OTHER PUBLICATIONS

German Search Report dated Aug. 4, 2015, with Statement of Relevancy (Nine (9) pages).

* cited by examiner

SHAFT SEAL SYSTEM AND A COMPRESSOR HAVING A CORRESPONDING SHAFT SEAL SYSTEM

This application claims the priority of German Patent Application No. DE 10 2014 217 647.6, filed Sep. 3, 2014, the disclosure of which is expressly incorporated by reference herein.

BACKGROUND AND SUMMARY OF THE INVENTION

The invention relates to a shaft seal system and a compressor having a corresponding shaft seal system.

Seals are used to separate areas having a fluid from areas without such a fluid. Seals pressurized with gas have proven successful for such purpose (German Patent Document No. DE 1 106 567). The gas (for example, pressurized air) can be supplied using an independent compressor, as is described in the U.S. Pat. No. 4,350,345. This separate air compressor is unsuitable for transient gas turbines, since the former requires additional space and increases unnecessarily the weight of the gas turbine.

Instead, pressurized air is channeled off from the compressor. As long as the gas turbine is operated at sufficient capacity (for example, travel speed), the pressure difference at the seal pressurized with gas is sufficiently high, such that the fluid is unable to flow beyond this seal. As a result, the fluid remains in the desired area (for example, in a chamber).

If, on the other hand, the gas turbine is operated at idle, i.e., the gas turbine is operated at reduced capacity, the gas pressure generated by the compressor is then reduced and, therefore, also the pressure difference at the seal pressurized with gas. In such a case, the pressure difference may fall to the point that it is not sufficient to inhibit the fluid from passing the seal, such that the fluid is then able to flow past the seal. However, this has the disadvantage that other areas of the gas turbine may then become contaminated with this fluid (for example, lubricating oil). At worst, such contamination may result in a total breakdown of the gas turbine.

Thus, the object underlying the present invention is to provide a shaft seal system, which is independent of the capacity demanded of a gas turbine, without increasing the weight of the gas turbine in the process.

The invention relates to a shaft seal system, which is disposed axially between a first chamber and a second chamber. The shaft seal system includes a shaft, a casing that surrounds the shaft and at least one seal, which is disposed, in particular, axially closer to the second chamber, where the first chamber includes a fluid and the second chamber is to be protected from this fluid. The seal includes at least one mechanical pressure booster.

A fluid may be understood to mean a lubricating fluid and/or vapors of the lubricating fluid.

In one advantageous embodiment of the invention, the pressure booster is formed in such a way that the pressure of a sealing gas flowing at the seal and in the direction of the first chamber is increased. The pressure upstream from the first chamber advantageously builds up in such a way that no sealing fluid is able to escape from the first chamber into the second chamber.

In another advantageous embodiment of the invention, at least one pressure booster rotates during operation and/or at least one pressure booster is stationary, where the rotating pressure booster is preferably disposed at the axial height of the stationary pressure booster. Rotating in this case may be understood to mean that the pressure booster rotates synchronously with the shaft. Stationary may be understood to mean that the pressure booster is decoupled from the shaft rotation. Thus, for example, the casing or any component disposed on the casing is stationary.

In another advantageous embodiment of the invention, the pressure booster is a helical groove, disposed preferably on the inner circumference of the casing. It is also conceivable that, in addition or alternatively, the helical groove is disposed on or in the outer surface of the shaft. The helical groove may, for example, be an internal or external thread. The thread or the helical groove has a right rotation or a left rotation, depending on the direction of rotation of the shaft. The thread (or the helical groove) may have at least one complete winding. This advantageously forms an air vortex traveling around the shaft or on the casing and flowing in the direction of the first chamber.

In another advantageous embodiment of the invention, the pressure booster is an elevation and/or an indentation, which is preferably disposed on the shaft. It is also conceivable that, in addition or alternatively, the indentations and/or elevations may be disposed on, respectively, the casing. The indentations and/or elevations may, for example, be disposed directly on the casing or on the shaft, or an adapter piece is disposed on the casing (or shaft), on which indentations and/or elevations are disposed. Furthermore, the indentations and/or elevations may have a triangular cross-section. This has the advantage that the sealing air is increasingly carried in the circumferential direction. At least one elevation and/or at least one indentation may extend at an angle to the rotational axis of the shaft, as is also mentioned below.

An elevation in terms of the invention is additional material that protrudes above the outer surface of the shaft. On the other hand, an indentation in terms of the invention is removed material that has been extracted from the outer surface of the shaft, such that the indentation is integrated in the shaft. If the pressure difference produced at the seal is too small, the fluid is then able to flow out of the first chamber into the second chamber in an undesirable manner. The indentation in, or the elevations on, the shaft cause an additional build-up of gas pressure, so that the pressure difference is unable to drop below a critical value. This effectively prevents the fluid from flowing out of the first chamber into the second chamber. As a result, the elevations or indentations on or in the shaft divert an increased gas mass flow, preferably in the circumferential direction.

The elevations and/or the indentations may be disposed at the axial height of the helical groove, provided that the rotating pressure booster includes at least one elevation and/or one indentation and the stationary pressure booster includes at least one helical groove. This is understood to mean that the elevations and/or indentations, when viewed in the radial direction, are disposed exactly opposite the helical groove.

In one advantageous embodiment of the invention, at least one of the elevations and/or at least one of the indentations may extend at an angle to the rotational axis of the shaft. The angle to the rotational axis in such a case is selected so that the flow of the gas in the direction of the first chamber is increased, in order thereby to increase the gas pressure upstream from the first chamber.

In another advantageous embodiment of the invention, the shaft seal system includes at least one additional seal, which is disposed axially closer to the first chamber. Furthermore, the additional seal may be disposed radially between the shaft and the casing. The seal may be preferably spaced axially apart from the additional seal. In this way, the seal may be disposed upstream from the additional seal. The direction of flow, to which reference is made, points in the direction from the second chamber to the first chamber. The additional seal may be designed as a gas seal in the form of a labyrinth seal. In this way, the gas pressure (viewed in the flow direction) is preferably greater upstream from the additional seal than the gas pressure (viewed in the flow direction) downstream from the additional seal. The area downstream from the second seal may correspond to the area of the first chamber. It has proven advantageous to increase upstream from the additional seal the pressure of the sealing gas flowing at the seal and in the direction of the additional seal. This may ensure that even at low rotational speeds, the pressure from the additional seal is sufficiently high, such that harmful fluid from the first chamber is unable to flow at the additional seal in the direction of the seal.

In another advantageous embodiment of the invention, an annular space is present axially between the seal and the additional seal and radially between the shaft and the casing. Thus, the annular space, viewed in the flow direction, is disposed upstream from the additional seal and downstream from the seal. This annular space advantageously offers the possibility of temporarily storing the gas flowing in the direction of the first chamber, in order to be able to compensate for possible pressure fluctuations.

In another advantageous embodiment of the invention, a shoulder is disposed on the inside of the casing between the seal and the additional seal and radially between the shaft and the casing. The shoulder, projecting preferably radially inwardly, may have an internal radius that is smaller than the internal radius of the casing at the height of the seal, such that the internal radius of the internal thread is greater than the internal radius of the shoulder.

In another advantageous embodiment of the invention, the additional seal includes at least one sealing fin, in particular, on the outer surface of the shaft, and/or a lining, in particular on the inside of the casing. The sealing fin and the lining are preferably disposed at the same height in the axial direction, such that the sealing fin is able to cut into the lining. The lining may be an abradable lining or a honeycomb structure having abradable material.

In another advantageous embodiment of the invention, a sealing gas, preferably air, flows from the second chamber to the first chamber along the shaft. In this case, the sealing gas flows from the second chamber initially through the seal. The sealing gas, if present, then flows past the inwardly projecting shoulder into the annular space. Finally, the sealing gas flows through the additional seal into the first chamber.

In another advantageous embodiment of the invention, the sealing gas is supplied by a compressor, in particular, by an engine compressor. This has the advantage that no additional compressor is required in order, for example, to generate pressurized air.

Exemplary embodiments of the invention are described in greater detail below with reference to the schematic drawings.

DETAILED DESCRIPTION OF THE DRAWINGS

Figure 1:
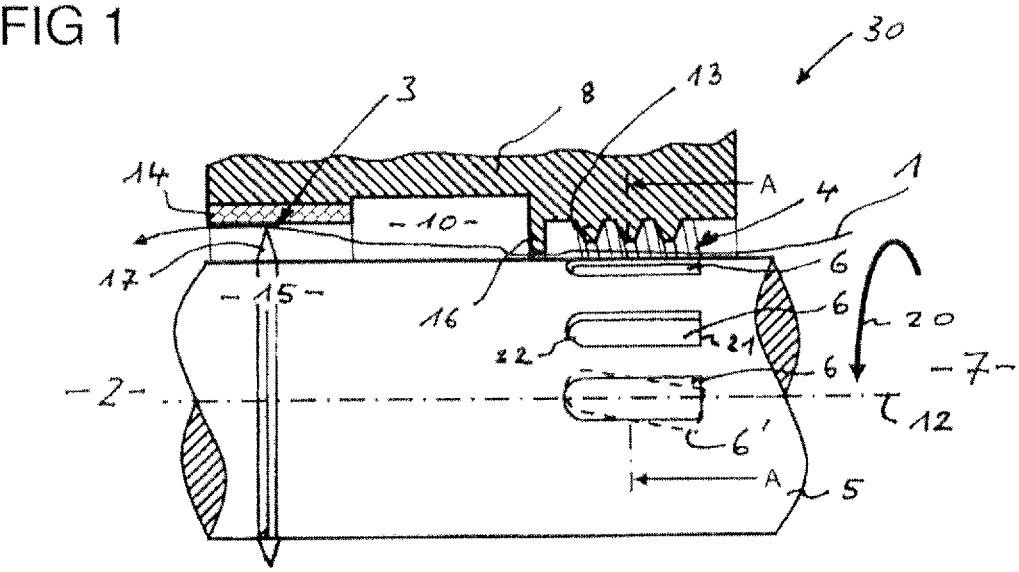
FIG. 1 shows a longitudinal section through an upper area of a casing with a shaft located therein.

FIG. 1 shows a shaft seal system 30 according to the invention, having a seal 4 and an additional seal 3 for sealing a first chamber 2 with a fluid (for example, a liquid) delineated to the left opposite a second chamber 7 delineated to the right without the liquid. A casing 8 is disposed about a shaft 5 which rotates in the direction of the arrow 20. For the sake of clarity, only the upper half of the casing 8 has been depicted here. In FIG. 1, a sealing gas 1 flows from right to left along the shaft 5, that is, from the second chamber 7 into the first chamber 2. The sealing gas is supplied preferably by an engine compressor. The seal 4 on the inside of the casing 8, to the right in FIG. 1, includes an internal thread 13 having, for example, three windings. The internal thread may, however, also have at least one winding up to 10 windings. The internal thread 13 in this case is a left-hand thread. If, on the other hand, the shaft 5 rotates opposite the direction 20 delineated, the internal thread must then be designed as a right-hand thread. The seal 4 includes multiple indentations 6 on the outer surface 15 of the shaft 5. The indentations 6 are disposed axially at the same height as the internal thread 13. The indentations extend generally parallel to the rotational axis 12 of the shaft 5. The indentations 6' may, however, also preferably be inclined to the rotational axis, as depicted by the dashed lines. The upstream end of the indentation 6 includes an edge 21 extending transversely to the rotational axis 12. The downstream end of the indentation 6, on the other hand, is a generally semi-circular edge 22. It should be noted that the indentation 6 may take any shape.

Following downstream from the internal thread 13 is a radially inwardly projecting shoulder 16, which is disposed on the casing 8 and extends over the entire circumference thereof. The internal radius of the shoulder 16 may be smaller than the internal radius of the internal thread 13. The inwardly projecting shoulder 16 may also be omitted entirely. Following downstream from the shoulder 16 is an annular groove 10 integrated in the casing 8, the internal radius of which in this exemplary embodiment is greater than the internal radius of the internal thread 13. Following downstream from the annular space 10 is the additional seal 3.

The additional seal 3 may include a lining 14 on the inside of the casing 8, in particular, an abradable lining. The additional seal 3 includes on the outer surface 15 of the shaft 5 a sealing fin 17, which extends over the entire circumference of the outer surface 15. Multiple sealing fins may be provided axially offset relative to one another, in order to implement a labyrinth seal. The tip of the sealing fin 17 may cut into the lining 14. Other types of seals are conceivable, such as a brush seal and/or a contacting sliding ring seal. Following downstream from the additional seal 3 is finally the first chamber 2.

Figure 2:
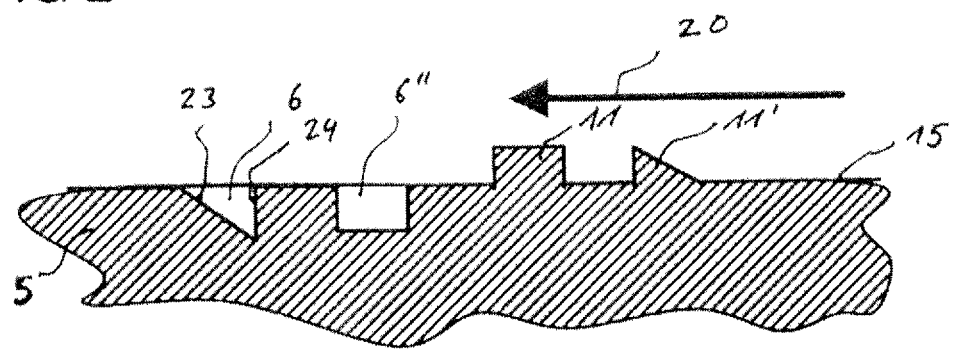
FIG. 2 shows a section along the line A-A in FIG. 1 through the shaft, where the outer surface of the shaft is depicted as unwound.

FIG. 2 shows a section along the line A-A in FIG. 1 through the shaft 5, the outer surface 15 of the shaft 5 being depicted as unwound. The shaft 5 rotates from right to left corresponding to the rotational direction 20. This section shows various embodiments of indentations and of elevations. Represented to the far left is the indentation 6 depicted in FIG. 1 having a triangular cross-section. In this example, a first side wall 23 extends wedge-like into the shaft 5. A second side wall 24 of the indentation 6 extends generally radially. To the right thereof, another indentation 6" may have a rectangular cross-section. Elevations 11 and 11' may be provided instead of or in combination alongside the indentations 6 and 6", as is depicted to the right in FIG. 2. The one elevation 11 has a rectangular cross-section and the other elevation 11' has a triangular cross-section.

In other exemplary embodiments not depicted, the outer surface 15 may, for example, include only elevations having identical cross-sections, which may be uniformly distributed over the circumference thereof. Other distributions, however, are also conceivable. The outer surface 15 may, however, also combine elevations 11, 11' and indentations 6, 6' and 6" arbitrarily with one another. Similarly, indentations adjacent to one another in the circumferential direction may, for example, have different cross-sections.

Such a shaft seal system 30 is preferably used for a bearing (for example, a slide bearing or ball bearing), which may be disposed upstream from an oil seal, in particular, a carbon oil seal.

List of Reference Characters:
1 Sealing gas
2 First chamber
3 Additional seal
4 Seal
5 Shaft
6 Indentation
7 Second chamber
8 Casing
10 Annular groove
11 Elevations
12 Rotational axis of shaft
13 Internal thread
14 Lining
15 Outer surface of shaft
16 Shoulder
17 Sealing fin
20 Rotational direction of shaft
21 Upstream edge
22 Downstream edge
23 First side wall of indentation
24 Second side wall of indentation
30 Shaft seal system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A shaft seal system which is disposed axially between a first chamber and a second chamber, comprising:
   a shaft;
   a casing that surrounds the shaft; and
   a seal, wherein the seal is disposed axially closer to the second chamber than the first chamber;
   wherein the first chamber includes a fluid;
   wherein the seal includes a mechanical pressure booster, wherein the mechanical pressure booster is shaped such that a pressure of a sealing gas flowing at the seal and in a direction of the first chamber is increased by the mechanical pressure booster, wherein the sealing gas is flowable from the second chamber to the first chamber along the shaft, and wherein the sealing gas is provided from a compressor;
   wherein the mechanical pressure booster comprises a first pressure booster and a second pressure booster and wherein the first pressure booster comprises a helical groove on the casing and the second pressure booster comprises a radially opposite series of spaced apart longitudinal indentations on the shaft.

2. The shaft seal system according to claim 1, wherein the indentations extend parallel to a rotational axis of the shaft.

3. The shaft seal system according to claim 1, wherein the indentations extend at an angle to a rotational axis of the shaft.

4. The shaft seal system according to claim 1, further comprising a second seal, wherein the second seal is disposed axially closer to the first chamber than the second chamber or is disposed radially between the shaft and the casing.

5. The shaft seal system according to claim 4, wherein an annular space is disposed axially between the seal and the second seal and is disposed radially between the shaft and the casing.

6. The shaft seal system according to claim 4, wherein a shoulder is disposed on an inside of the casing between the seal and the second seal and is disposed radially between the shaft and the casing.

7. The shaft seal system according to claim 4, wherein the second seal includes a sealing fin on an outer surface of the shaft or a lining on an inside of the casing.

8. An engine compressor comprising a shaft seal system according to claim 1.

* * * * *